United States Patent
Cradick et al.

(10) Patent No.: US 9,148,495 B2
(45) Date of Patent: Sep. 29, 2015

(54) DYNAMIC RUNTIME CHOOSING OF PROCESSING COMMUNICATION METHODS

(75) Inventors: Ryan K. Cradick, Oronoco, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 13/190,757

(22) Filed: Jul. 26, 2011

(65) Prior Publication Data

US 2013/0031263 A1   Jan. 31, 2013

(51) Int. Cl.
*G06F 15/16* (2006.01)
*H04L 29/06* (2006.01)

(52) U.S. Cl.
CPC .............. *H04L 69/08* (2013.01); *H04L 69/18* (2013.01)

(58) Field of Classification Search
CPC . H04L 29/06027; H04L 65/608; H04L 45/70; H04L 49/00; H04L 49/356; H04L 29/06476; H04L 65/4092; H04L 61/2015; H04L 29/1282; H04L 61/6013; H04L 45/00; H04W 88/10
USPC .......................................................... 709/230
See application file for complete search history.

(56) References Cited

U.S. PATENT DOCUMENTS

| | | | |
|---|---|---|---|
| 4,612,624 A | 9/1986 | Tsuji | |
| 6,243,755 B1 | 6/2001 | Takagi et al. | |
| 6,347,254 B1 | 2/2002 | Lu | |
| 6,516,409 B1 | 2/2003 | Sato | |
| 7,206,861 B1 | 4/2007 | Callon | |
| 7,480,640 B1 | 1/2009 | Elad et al. | |
| 7,529,752 B2 | 5/2009 | Hinshaw et al. | |
| 7,577,667 B2 | 8/2009 | Hinshaw et al. | |

(Continued)

FOREIGN PATENT DOCUMENTS

| | | |
|---|---|---|
| JP | 10097437 A | 4/1998 |
| JP | 2001325041 A | 11/2001 |
| WO | 2010020577 A1 | 2/2010 |

OTHER PUBLICATIONS

U.S. Appl. No. 13/682,008 entitled "Dynamic Reduction of Stream Backpressure", filed Nov. 20, 2012.

(Continued)

*Primary Examiner* — John MacIlwinen
*Assistant Examiner* — Imran Moorad
(74) *Attorney, Agent, or Firm* — Patterson & Sheridan, LLP

(57) ABSTRACT

Techniques are described for assigning and changing communication protocols for a pair of processing elements. The communication protocol determines how the pair of processing elements transmits data in a stream application. The pair may be assigned a communication protocol (e.g., TCP/IP or a protocol that uses a relational database, shared file system, or shared memory) before the operator graph begins to stream data. This assignment may be based on a priority of the processing elements and/or a priority of the communication protocols. After the operator graph begins to stream data, the pair of processing elements may switch to a different communication protocol. The decision to switch the communication protocol may be based on whether the pair of processing elements or assigned communication protocol is meeting established performance standards for the stream application.

21 Claims, 7 Drawing Sheets

(56) References Cited

U.S. PATENT DOCUMENTS

| | | | |
|---|---|---|---|
| 7,644,863 | B2 | 1/2010 | Chen et al. |
| 7,834,875 | B2 | 11/2010 | Liu et al. |
| 7,860,009 | B2 | 12/2010 | Pike et al. |
| 7,944,863 | B2 | 5/2011 | Smith et al. |
| 8,055,492 | B2 | 11/2011 | Adir |
| 8,090,974 | B1 | 1/2012 | Jain et al. |
| 2002/0083063 | A1 | 6/2002 | Egolf |
| 2003/0229817 | A1 | 12/2003 | Colasurdo et al. |
| 2004/0052212 | A1 | 3/2004 | Baillargeon |
| 2006/0004935 | A1* | 1/2006 | Seto et al. .................. 710/62 |
| 2006/0026269 | A1* | 2/2006 | Sadovsky et al. ............ 709/222 |
| 2006/0036619 | A1 | 2/2006 | Fuerst et al. |
| 2006/0064438 | A1 | 3/2006 | Aggarwal |
| 2006/0206706 | A1 | 9/2006 | Dietz |
| 2006/0218123 | A1 | 9/2006 | Chowdhuri et al. |
| 2006/0224763 | A1 | 10/2006 | Altunbasak et al. |
| 2006/0277230 | A1 | 12/2006 | Nishizawa et al. |
| 2007/0073685 | A1 | 3/2007 | Thibodeau et al. |
| 2007/0091089 | A1 | 4/2007 | Jiao et al. |
| 2007/0091827 | A1 | 4/2007 | Boers et al. |
| 2007/0129045 | A1* | 6/2007 | Aerrabotu ................ 455/343.5 |
| 2007/0147258 | A1 | 6/2007 | Mottishaw et al. |
| 2007/0240112 | A1 | 10/2007 | Haselden et al. |
| 2007/0288635 | A1 | 12/2007 | Gu et al. |
| 2007/0299980 | A1 | 12/2007 | Amini et al. |
| 2008/0000539 | A1 | 1/2008 | Bivin |
| 2008/0005392 | A1 | 1/2008 | Amini et al. |
| 2008/0028095 | A1 | 1/2008 | Lang et al. |
| 2008/0052041 | A1 | 2/2008 | Misra et al. |
| 2008/0071939 | A1 | 3/2008 | Tanaka et al. |
| 2008/0168179 | A1 | 7/2008 | Gu et al. |
| 2008/0219281 | A1* | 9/2008 | Akin et al. ................ 370/419 |
| 2008/0238923 | A1 | 10/2008 | Liu et al. |
| 2009/0003600 | A1* | 1/2009 | Chen et al. ................ 380/217 |
| 2009/0034498 | A1 | 2/2009 | Banerjea et al. |
| 2009/0037553 | A1 | 2/2009 | Yuan et al. |
| 2009/0178043 | A1 | 7/2009 | Prasanna et al. |
| 2009/0216624 | A1 | 8/2009 | Kato |
| 2009/0216694 | A1 | 8/2009 | Lang et al. |
| 2009/0254774 | A1 | 10/2009 | Chamdani et al. |
| 2009/0313400 | A1 | 12/2009 | Amini et al. |
| 2009/0313614 | A1 | 12/2009 | Andrade et al. |
| 2009/0313641 | A1 | 12/2009 | Chou et al. |
| 2010/0030896 | A1 | 2/2010 | Chandramouli et al. |
| 2010/0106946 | A1 | 4/2010 | Imaki et al. |
| 2010/0199276 | A1* | 8/2010 | Umbehocker ................ 718/1 |
| 2010/0229178 | A1 | 9/2010 | Ito |
| 2010/0292980 | A1 | 11/2010 | Andrade et al. |
| 2010/0293532 | A1 | 11/2010 | Andrade et al. |
| 2010/0293535 | A1 | 11/2010 | Andrade et al. |
| 2011/0022812 | A1* | 1/2011 | van der Linden et al. .... 711/163 |
| 2011/0191759 | A1 | 8/2011 | Andrade et al. |
| 2012/0123994 | A1 | 5/2012 | Lowry et al. |
| 2012/0166417 | A1 | 6/2012 | Chandramouli et al. |
| 2012/0179809 | A1 | 7/2012 | Barsness et al. |
| 2012/0324453 | A1 | 12/2012 | Chandramouli et al. |
| 2013/0080652 | A1 | 3/2013 | Cradick et al. |
| 2013/0080653 | A1 | 3/2013 | Santosuosso et al. |
| 2013/0081042 | A1 | 3/2013 | Branson et al. |
| 2013/0290969 | A1 | 10/2013 | Branson et al. |
| 2013/0346390 | A1 | 12/2013 | Jerzak et al. |

OTHER PUBLICATIONS

U.S. Appl. No. 13/681,919 entitled "Using Predictive Determinism Within a Streaming Environment", filed Nov. 20, 2012.
U.S. Appl. No. 13/681,820 entitled "Dynamic Runtime Choosing of Processing Communication Methods", filed Nov. 20, 2012.
U.S. Appl. No. 13/681,769 entitled "Management System for Processing Streaming Data", filed Nov. 20, 2012.
U.S. Appl. No. 13/361,287 entitled "Processing Element Management in a Streaming Data System", filed Jan. 30, 2012.
U.S. Appl. No. 13/709,405 entitled "Processing Element Management in a Streaming Data System", filed Dec. 10, 2012.
U.S. Appl. No. 13/456,600 entitled "Operator Graph Changes in Response to Dynamic Connections in Stream Computing Applications", filed Apr. 26, 2012.
U.S. Appl. No. 13/675,872 entitled "Streams Optional Execution Paths Depending Upon Data Rates", filed Nov. 13, 2012.
U.S. Appl. No. 13/706,115 entitled "Streams Optional Execution Paths Depending Upon Data Rates", filed Dec. 5, 2012.
International Search Report and Written Opinion of the ISA dated Dec. 20, 2012—International Application No. PCT/IB2012/053790.
Lipasti et al., "Exceeding the dataflow limit via value prediction.", In Proceedings of the 29th annual ACM/IEEE international symposium on Microarchitecture (MICRO 29), IEEE Computer Society, Washington, DC, USA, 226-237.
U.S. Appl. No. 13/780,800 entitled, "Operator Graph Changes in Response to Dynamic Connections in Stream Computing Applications", filed Feb. 28, 2013.
Da Costa et al., "The Dynamic Trace Memoization Reuse Technique", Parallel Architectures and Compilation Techniques, Oct. 2000, pp. 92-99, Philadelphia, USA.
International Search Report and Written Opinion of the ISA dated May 14, 2013—International Application No. PCT/IB2013/050228.
US Patent Application entitled "Dynamic Reduction of Stream Backpressure", filed Nov. 20, 2012.
US Patent Application entitled "Using Predictive Determinism Within a Streaming Environment", filed Nov. 20, 2012.
US Patent Application entitled "Management System for Processing Streaming Data", filed Nov. 20 ,2012.
Ishii, Atsushi et al., Elastic Stream Computing with Clouds, 2011 IEEE 4th International Conference on Cloud Computing, Jul. 2011, pp. 195-202, IEEE, Piscataway, United States.
Gedik, Bugra et al., Spade: The System S Declarative Stream Processing Engine, Proceedings of the 2008 ACM SIGMOD international conference on Management of data, Jun. 2008, pp. 1123-1134, ACM, New York, United States.

* cited by examiner

DYNAMIC RUNTIME CHOOSING OF PROCESSING COMMUNICATION METHODS

BACKGROUND

1. Field of the Invention

Embodiments of the present invention generally relate to stream applications. Specifically, the invention relates to assigning a communication protocol for transferring data between processing elements in a stream application.

2. Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the invention provide a method, system and computer program product for processing data which include establishing an operator graph of a plurality of processing elements. The operator graph defines at least one execution path, in which a first processing element of the plurality of processing elements is configured to transmit data to at least one downstream processing element. Moreover, the first processing element is capable of transmitting data to the at least one downstream processing element using at least one of a first communication protocol and a second communication protocol. The method, system, and computer program product transmit data from the first processing element to the at least one downstream processing element using the first communication protocol and determine whether to switch from the first communication protocol to the second communication protocol. Upon determining to switch, the method, system, and computer program product transmit data from the first processing element to the at least one downstream processing element using the second communication protocol.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
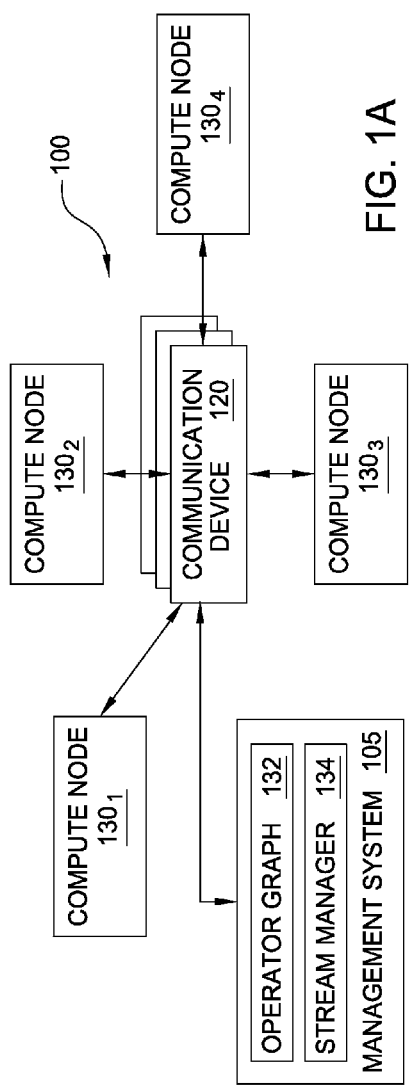
FIGS. 1A-1B illustrate a computing infrastructure configured to execute a stream application, according to one embodiment of the invention.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream application, operators are connected to one another such that data flows from one operator to the next forming a logical dataflow graph. Scalability is reached by distributing an application across nodes by creating many small executable pieces of code (i.e., processing elements), as well as load balancing among them. One or more operators in a stream application can be fused together to form a processing element. Doing so allows the fused operators to share a common process space (i.e., shared memory), resulting in much faster communication between operators than is available using inter-nodal communication protocols (e.g., using a TCP/IP). Further, groups of processing elements (i.e., jobs) can be inserted or removed dynamically from one or more applications performing streaming data analysis.

One advantage of stream applications is that they allow the user to granularly control the process flow of data through the application. In other words, the user may designate specific operators for each processing element that perform various operations on the incoming data, and may dynamically alter the stream application by modifying the operators and the order in which they are performed.

Additionally, stream applications are able to use a variety of communication protocols to transfer data between processing elements. These protocols may be classified into two types: intra-nodal and inter-nodal. Intra-nodal communication protocols may be used when a processing element transfers data to a processing element located on the same compute node. This type may be performed, for example, by using a shared data bus to directly transfer data from one processing element to another or by using shared memory within the compute node (e.g., RAM). Inter-nodal communication protocols may be used for processing elements that are executed on either the same compute node or different compute nodes. Inter-nodal communication protocols include protocols that use, for example, TCP/IP, shared file systems, relational databases, or remote direct memory access (RDMA). Generally, inter-nodal communication protocols use communication devices (e.g., a server or database) that are external to the compute node in contrast to shared memory or a bus that are located within a compute node.

During initialization of the stream application, the communication protocol used to transfer data between two processing elements may be assigned based on a determined priority for the processing elements and/or the different communication protocols. Moreover, a previously assigned communication protocol may be switched to a different communication protocol after the stream application begins processing data. For example, if the previous communication protocol between two processing elements was TCP/IP, the processing elements may instead use a relational database to transmit data. The decision to switch communication protocols may be based on meeting performance standards or reducing costs of the stream application.

After determining to switch the communication protocol, the stream application may instruct the affected processing elements to reset or switch over to the new protocol. Further, if the communication protocol is switching from an inter-nodal protocol to an intra-nodal protocol, one or more of the affected processing elements may migrate to a different compute node. The same methods and techniques apply outside of a data streaming environment. For example, the processing elements may be executable units linked together in a manner defined by the operator graph.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider. Doing so allows a user to access this information from any computing system attached to a network connected to the cloud (e.g., the Internet).

Figure 1B:
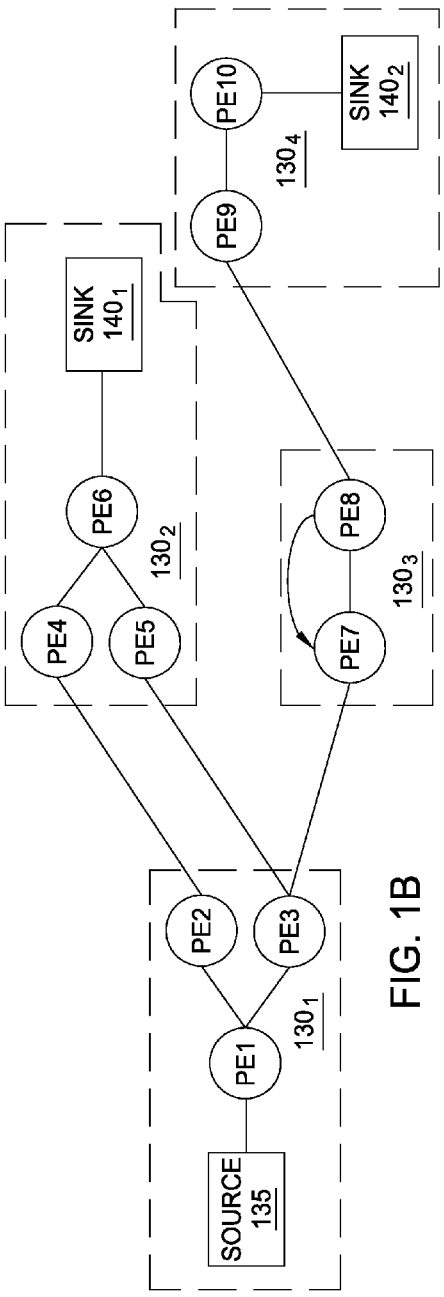

FIGS. 1A-1B illustrate a computing infrastructure configured to execute a stream application, according to one embodiment of the invention. As shown, the computing infrastructure 100 includes a management system 105 and a plurality of compute nodes $130_{1-4}$, which are communicatively coupled to each other using one or more communication devices 120. The communication devices 120 (e.g., a server, network, or database) may use a particular communication protocol to transfer data between the compute nodes $130_{1-4}$. Although not shown, the compute nodes $130_{1-4}$ may have internal communication devices 120 for transferring data between processing elements (PEs) located on the same compute node 130. Also, the management system 105 includes an operator graph 132 and a stream manager 134. As described in greater detail below, the operator graph 132 represents a stream application beginning from one or more source operators through to one or more sink operators. This flow from source to sink is also generally referred to herein as an execution path. Although this shows an operator graph in a data streaming application, an operator graph may be understood to be any representation of multiple executable units linked together—e.g., the operator graph 132 might not have an associated source and sink.

Typically, processing elements receive an N-tuple of data attributes from the stream as well as emit an N-tuple of data attributes into the stream (except for a sink operator where the stream terminates or a source operator where the stream begins). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream application running on the compute nodes $130_{1-4}$, as well as to change the structure of the operator graph 132. The stream manager 134 may move PEs from one compute node 130 to another, for example, to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

FIG. 1B illustrates an example operator graph 132 that includes ten processing elements (labeled as PE1-PE10) running on the compute nodes $130_{1-4}$. While a processing element may be executed as an independently running process with its own process ID (PID) and memory space, multiple processing elements may also be fused to run as single process or job (with a PID and memory space). In cases where two (or more) processing elements are running independently, inter-nodal communication may occur using a network socket (e.g., a TCP/IP socket). However, when processes are fused together, the fused processing elements can use more rapid intra-nodal communication protocols, such as shared memory, for passing tuples (or other data) among the joined operators in the fused processing elements.

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
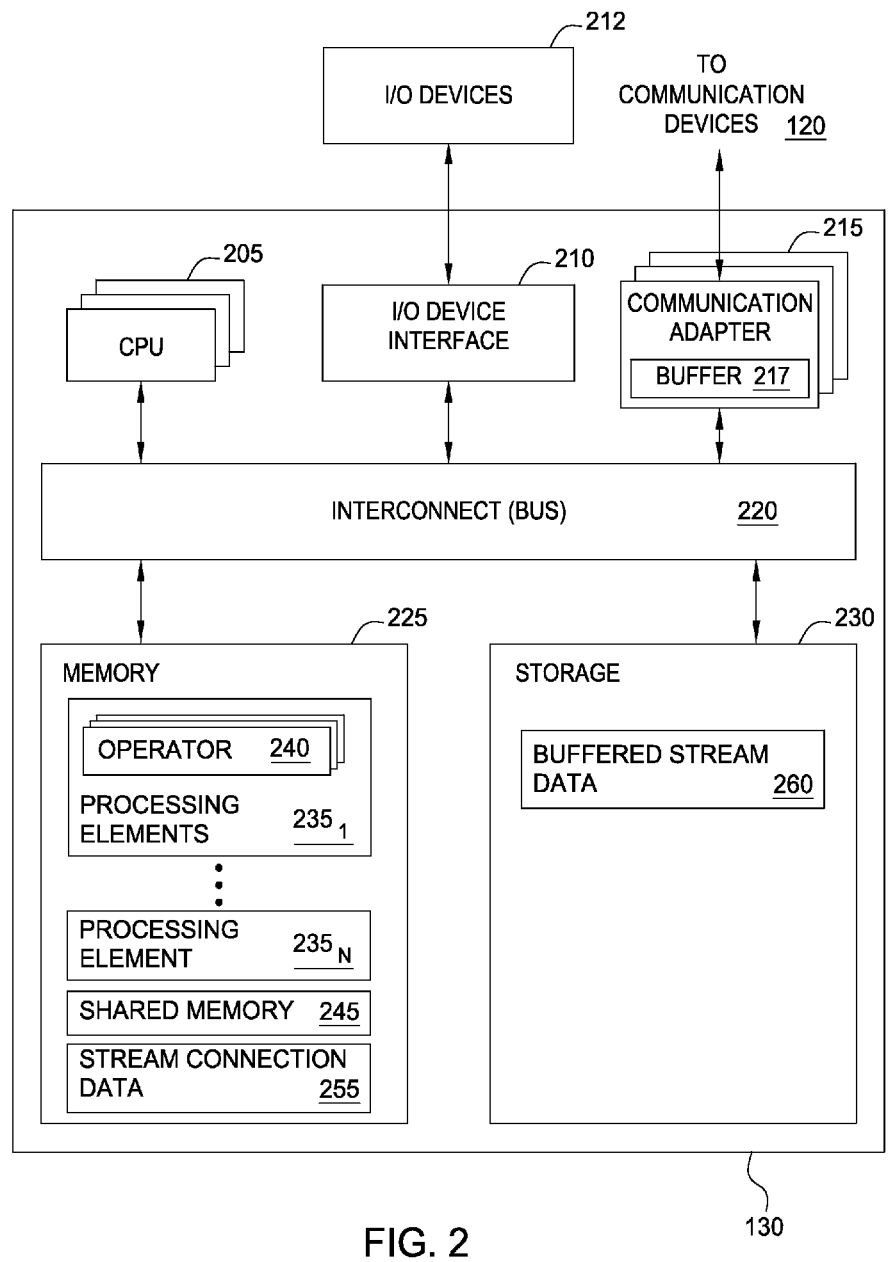
FIG. 2 is a more detailed view of the compute node of FIGS. 1A-1B, according to one embodiment of the invention.

FIG. 2 is a more detailed view of the compute node 130 of FIGS. 1A-1B, according to one embodiment of the invention. As shown, the compute node 130 includes, without limitation, at least one CPU 205, multiple communication adapters 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, communication adapters 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state device (SSD), or flash memory storage drive, may store non-volatile data. The multiple communication adapters 215 (e.g., network adapters or query engines) facilitate communication with one or more communication devices 120 that use a particular communication protocol, such as TCP/IP, RDMA protocols, a shared file system protocol, and the like. The communication adapters 215 also include buffers 217 that store data waiting to be transmitted to the communication devices 120.

In this example, the memory 225 includes multiple processing elements $235_{1-N}$, shared memory 245, and stream connection data 255. Each PE 235 includes a collection of operators 240. As noted above, each operator 240 may provide a small chunk of executable code configured to process data flowing into a processing element (e.g., PE 235) and to emit data to other operators 240 in that PE and to other processing elements in the stream application. Such processing elements may be on the same compute node 130 or on other compute nodes accessible via the communication devices 120. The shared memory 245 is memory space that is accessible by at least two of the processing elements 235 running on the compute node 130. The stream connection data 255 represents the connections between PEs 235 on a compute node 130 (e.g., using the shared memory 245), as well as possible connections to other compute nodes executing PEs which are located upstream or downstream of the PEs 235 in the operator graph 132.

As shown, storage 230 contains buffered stream data 260 which represents a storage space—i.e., a buffer—for data flowing into the compute node 130 from upstream processing elements (or from a data source for the stream application). For example, buffered stream data 260 may include data tuples waiting to be processed by one of the PEs 235. Buffered stream data 260 may also store the results of data processing performed by processing elements 235 that will be sent to downstream processing elements. For example, a PE 235 may have to store tuples intended for a downstream PE 235 if that PE 235 already has a full buffer, which may occur when the operator graph is experiencing backpressure.

Figure 3:
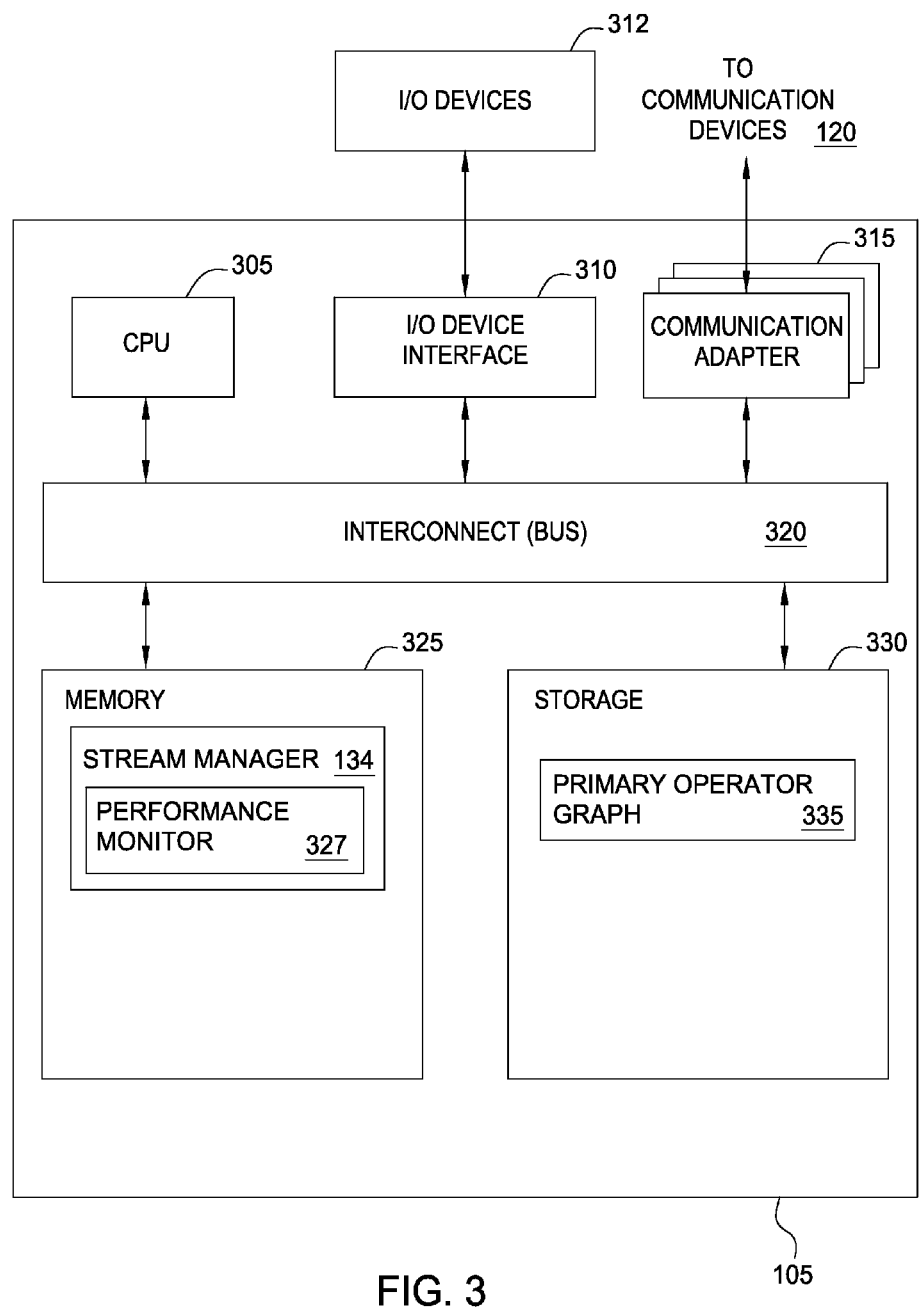
FIG. 3 is a more detailed view of the server computing system of FIG. 1, according to one embodiment of the invention.

FIG. 3 is a more detailed view of the management system 105 of FIG. 1, according to one embodiment of the invention. As shown, management system 105 includes, without limitation, a CPU 305, communication adapters 315, an interconnect 320, a memory 325, and storage 330. The client system 130 may also include an I/O device interface 310 connecting I/O devices 312 (e.g., keyboard, display and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, communication adapters 315, and memory 325. Like CPU 205, CPU 305 is included to be representative of a single CPU, multiple CPUs, a single CPU having multiple processing cores, and the like. Memory 325 is generally included to be representative of a random access memory. The communication adapters 315 are configured to transmit data via the communication devices 120 to the compute nodes 130 using any number of communication protocols. This may the same or different communication protocol used by the PEs 235 to transmit data. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices. The storage includes a primary operator graph 335. The primary operator graph 335, like the one illustrated in FIG. 1B, defines the arrangement of the processing elements, as well as the communication protocol used by each processing element to communicate with a downstream processing element.

The stream manager 134 includes a performance monitor 327. The performance monitor 327 may evaluate either past or current conditions of the stream application to determine what communication protocol to assign to a processing element or whether to change a previously assigned communication protocol. The performance monitor 327 may use indicators, such as CPU utilization or buffered stream data 260, to gather performance related data for determining whether to switch a communication protocol.

Figure 4:
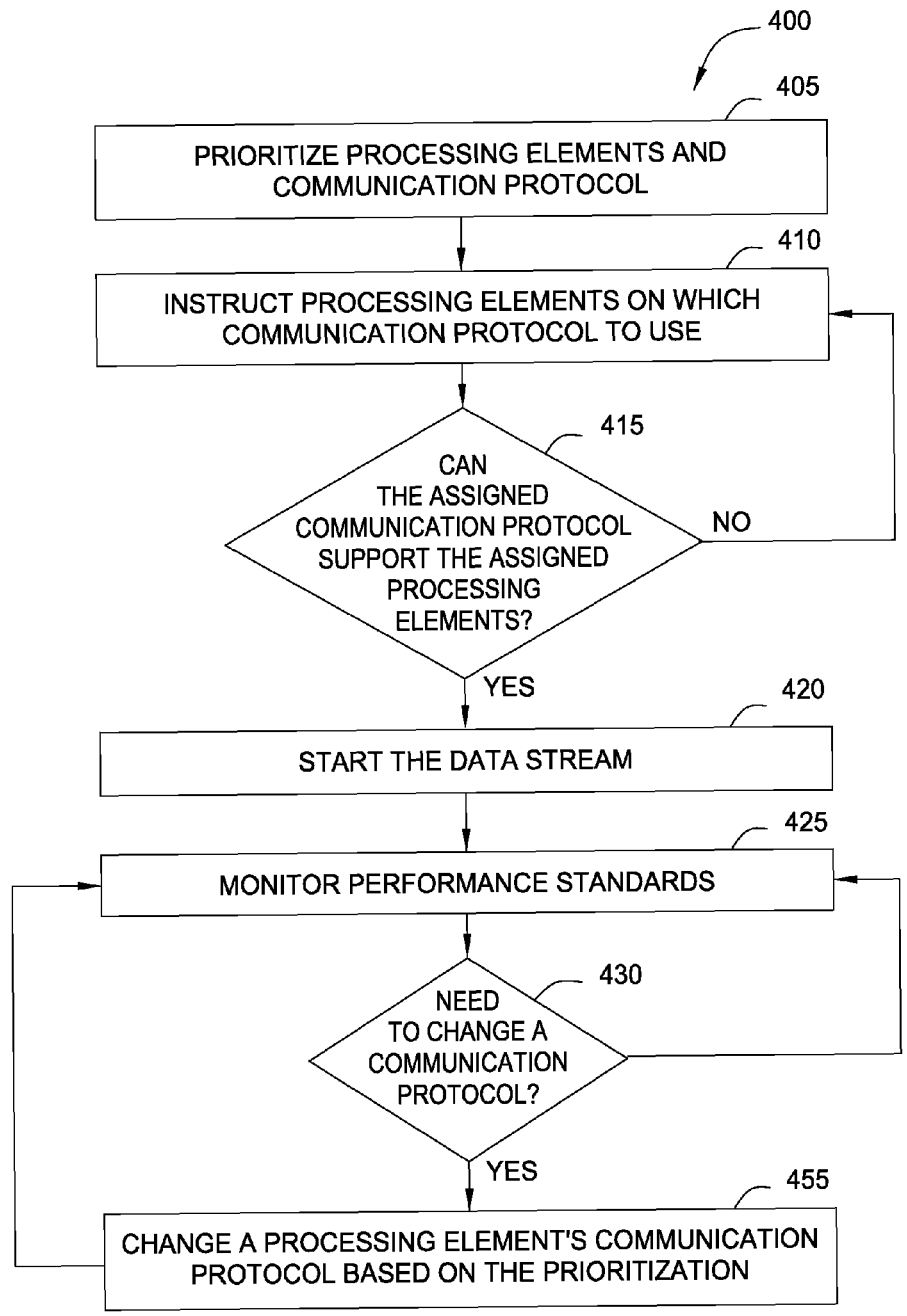
FIG. 4 is a flow diagram illustrating changing the communication protocol used by a processing element, according to embodiments of the invention.

FIG. 4 is a flow diagram illustrating assigning and changing the communication protocol used by a processing element, according to embodiments of the invention. At step 405, each processing element may be prioritized individually or by its association with a job. For example, a processing element may be part of a job that processes information submitted by a client, and as such, may be given a higher priority than a processing element that performs routine system maintenance. Alternatively, the priority of each job or processing element may be set by a system administrator. In one embodiment, the stream manager 134 may prioritize each processing element by the predicted amount of data the processing element will transmit (e.g., if the stream application has not yet begun to process data). This prediction may be based on historical data from previously running the same or similar stream application.

In addition to prioritizing processing elements, the stream manager 134 may also prioritize different communication protocols—i.e., inter- and intra-nodal communication protocols. Inter-nodal communication protocols include protocols that use TCP/IP, shared file systems, relational databases, or RDMA using, for example, InfiniBand™ (InfiniBand™ is a trademark of the InfiniBand Trade Association). Intra-nodal communication protocols include protocols that use shared memory 245 or the interconnect bus 220 to transmit data to a processing element running on the same compute node. Each protocol may be prioritized based on system limitations, speed, or cost of using the protocol to transmit data. For example, a TCP/IP system may be limited by a certain number of ports or bandwidth which caps the number of processing elements that may use this type of communication. Accordingly, a communication protocol that has a low cap may be assigned a priority that ensures that only the processing elements that need that particular communication protocol are assigned to it. Also, the data transfer rates of the communication protocol may be considered. If RDMA provides higher data transfer rates than using a relational database, RDMA may be assigned a priority to ensure more processing elements are assigned to it rather than the relational database. The stream manager 134 may also consider the cost of implementing or using the communication protocol. If using an intra-nodal communication protocol tends to wear out the associated hardware faster than using an inter-nodal communication protocol, the inter-nodal protocol may be assigned to as many processing elements as feasible. Furthermore, the stream manager 134 may consider one or all of these factors when assigning priority. For example, using a shared file system may provide higher speeds than TCP/IP but have a lower cap on the number of processing elements that can use the protocol. Accordingly, the stream manager 134 may designate a priority to the shared file system so that the processing elements are assigned to it until the cap is reached.

However, the invention is not limited to the communication protocols discussed above; rather, any communication protocol that transfers data between processing elements may be used.

At step 435, the stream manager 134 may then use the prioritized processing element and/or prioritized communication protocols to assign a communication protocol to each processing element in the operator graph. For example, the highest priority processing elements may be assigned to the highest priority communication protocols. Generally, each processing element in a stream application may use multiple communication protocols. As shown in FIG. 2, a computer node 130 may include multiple communication adapters 215 for facilitating communication with other processing elements using a variety of protocols. Once the stream manager 134 assigns a particular communication protocol to a pair of processing elements, the processing elements use the corresponding communication adapters 215 for the assigned communication protocol to transmit and receive data.

At step 415, the stream manager 134 may ensure that each communication protocol can support the number of processing elements assigned to it. This may apply equally to both inter- and intra-nodal communication protocols. For example, a TCP/IP may have a capped amount of bandwidth that may be used; once the number of connections exceeds the available bandwidth, the data fails to transfer. Moreover, a communication protocol may be able to physically support the number of processing elements but will not be able to transfer data within certain parameters. For example, using shared memory 245 between multiple processing elements on the same compute node may provide the highest data transfer rates, however, the effective data transfer rate may fall dramatically as more processing elements are assigned to use that shared memory 245. Thus, the stream manager 134 may check the assigned communication protocol to ensure that the compute node can transfer data using the shared memory and still meet certain performance parameters—e.g., a minimum data transfer rate. If not, the method 400 may return to step 410 to reassign the communication protocol by, for example, lowering the priority of the shared memory such that a different communication protocol is assigned.

In one embodiment, step 405—i.e., prioritizing the processing elements and protocols—may be omitted. Instead, a system administrator or a default setting for each processing element may determine the assigned communication protocol. Nonetheless, at step 415 the stream manager 134 may check the selected communication protocols to ensure that each protocol can support the number of assigned processing elements. If not, the stream manager 134 may change the assigned communication protocol for a pair of processing elements to one that can support the additional transferred data.

If the assigned communication protocols can support the associated processing elements, at step 420 the stream manager 134 may start processing data based on the operator graph.

At step 425, the performance monitor 327 may gather performance data from indicators associated with each processing element or communication protocol and compare the data to one or more performance standards. The performance monitor 327 may obtain performance data by monitoring, for example, CPU utilization, buffered stream data 260, disk or page faults, the amount of data transferred between each processing element using a particular communication protocol, contentions from multiple processing elements using a single communication protocol, and the like. A high CPU utilization rate (e.g., greater than 90%) may indicate that a processing element or elements associated with the CPU are processing significant amounts of data. Since this processed data is likely to be transmitted to downstream processing elements, the performance monitor 327 may instruct the stream manager 134 to switch the communication protocol of the busy processing element to a faster communication protocol. Similarly, if the data stored in the buffered stream data 260 is increasing rapidly, the associated processing element may be unable to transfer the stored data to a downstream element as fast as the processing element can process the data. Switching to a communication protocol with a higher data transfer rate may prevent the buffer from reaching its maximum capacity. Also, too many page faults may indicate that a communication protocol that uses hierarchical memory is an inefficient method for transmitting data—e.g., if the shared memory 245 is continually forced to swap out data pages in the memory 225 with data pages in the storage 230. As the number of page faults increases, the ability of the shared memory 245 to quickly fulfill data requests may be reduced.

The performance monitor 327 may also evaluate the amount of data being transmitted on each of the communication protocols used by the processing elements in the operator graph. For example, if two processing elements transfer data using a relational database where the first processing element stores data in the database that is later retrieved by a second processing element, the performance monitor 134 may determine the amount of data that is being transferred. Assuming that the relational database transfers large amounts of data faster than a TCP/IP socket but requires more energy, if the first processing element is transferring only small amounts of data, the stream application may save on operating costs without sacrificing performance by switching the communication protocol used by first and second processing elements to a TCP/IP socket.

The performance monitor 327 may also evaluate the proportional amount each communication protocol is used in the stream application. Too many processing elements using the same communication protocol may cause contention. However, different communication protocols experience contention differently. For example, when using TCP/IP, contention may occur at the associated communication adapter 215. The performance monitor 327 may detect that the associated buffer 217 is filling up rapidly—i.e., the communication adapter 215 is unable to transmit as much data as it receives—and instruct the stream manager 134 to switch the communication protocol for one or more pairs of processing elements that use the shared adapter 215. When using shared memory 245, the processing elements may use the same interconnect bus 205 to both transfer data between processing elements and transfer data to and from the CPU 305. If too many processing elements are attempting to use the same interconnect bus 205, it may become a source of contention. Accordingly, the performance monitor 327 may instruct the stream manager 134 to switch the communication protocol for one or more pairs of processing elements using the interconnect bus 205 to transmit data.

At step 430, the performance monitor 327 may evaluate performance data from one or more of the above mentioned indicators and compare the data to predetermined performance standards. If the measured performance associated with a processing element or a pair of processing elements is not meeting the performance standard, the performance monitor 327 instructs the stream manager 134 to switch the communication protocol used by the processing element. The invention, however, is not limited to the indicators discussed above. Rather, any indicator that performs the functions described herein may be used.

After receiving the instruction from the performance monitor 327, the stream manager 134 may determine if there is another communication protocol available for the underperforming processing element or pair of processing elements. If the pair is already using the fastest communication protocol, then switching the communication protocol is unlikely to increase performance. However, if there is a faster communication protocol available, the stream manager 134 may instruct the pair to switch to the faster protocol if the protocol can support the additional processing element without exceeding the system limitations or failing to meet performance standards.

In one embodiment, a processing element may switch communication protocols based on a factor other than performance. The performance monitor 327 may also consider, for example, operating costs or deterioration of hardware components. Thus, a processing element may switch to a communication protocol that is slower but which may save energy or replacement costs of the hardware executing the stream application.

At step 435, the stream manager 134 changes the communication protocol of at least one pair of processing elements. If there is only one pair of processing elements to reassign, then the stream manager 134 may assign a new communication protocol that meets the goals of the stream application (i.e., increases performance or reduces operating costs). If there are multiple pairs to reassign, the stream manager 134 may use the prioritizations assigned in step 405 to determine which pair of processing elements is assigned to which communication protocol. For example, the stream manager 134 may assign a processing element that processes client information to a communication protocol with a higher rate of data transfer than a processing element that processes data for routine system maintenance. Moreover, the stream manager 134 may prioritize the processing elements by when the processing elements were added to the operator graph. Because operator graphs may be dynamic, a processing element can be added after the data stream has begun. The stream manger 134 may assign either a higher or lower priority to the new processing elements and select the communication protocol accordingly. Alternatively, the processing elements may be reprioritized based on how much the processing elements are underperforming or how much they cost to operate. The slowest or most expensive processing element may be assigned the fastest or cheapest communication protocol to maximize the goals of the stream application.

In one embodiment, the upstream processing element transmits data to the downstream processing element using a first communication protocol but not using a second communication protocol. After the switch, the upstream processing element transmits data to the downstream processing element using the second communication protocol but not using the first communication protocol.

After the communication protocols are switched, the method 400 returns to step 425 to continue to monitor whether each processing element is meeting the performance standards.

Figure 5A:
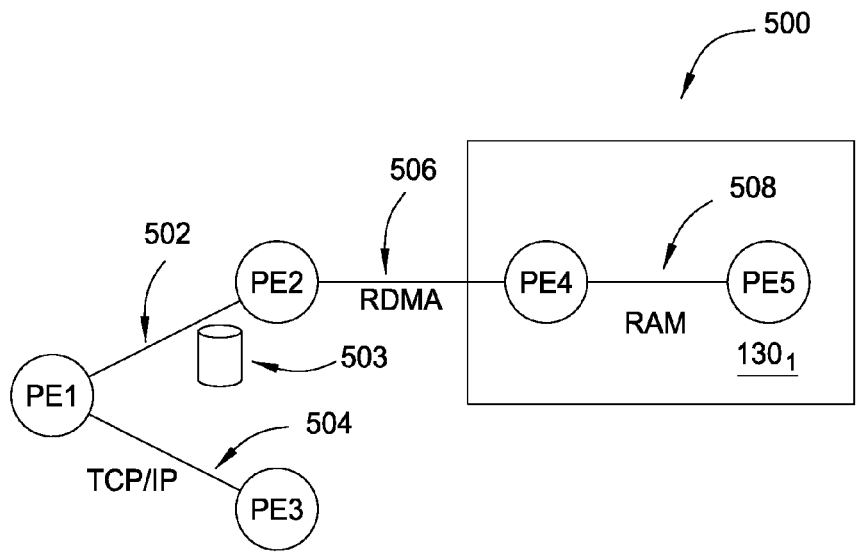
FIG. 5A-5B illustrate changing communication protocols for processing elements, according to one embodiment of the invention.
Figure 5B:
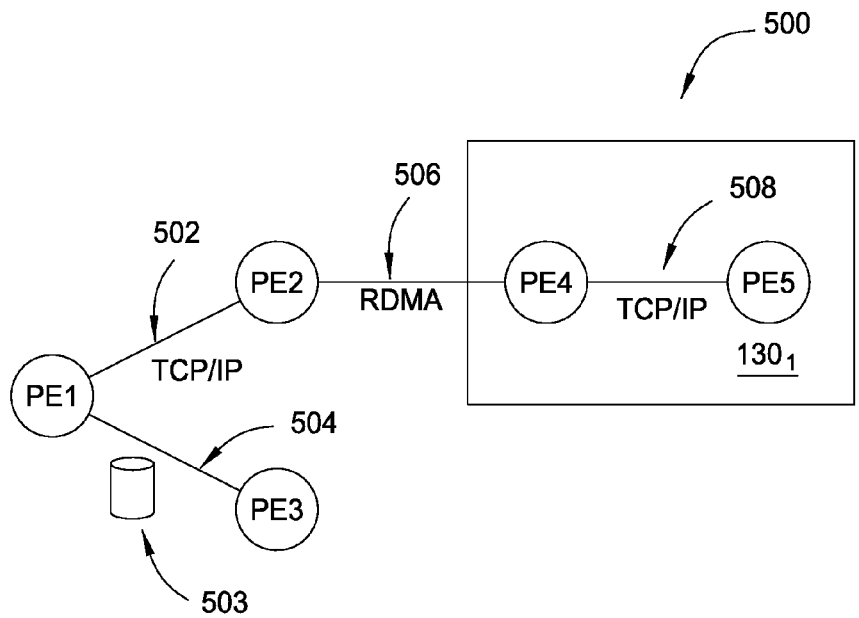

FIG. 5A-5B illustrate changing communication protocols for processing elements, according to one embodiment of the invention. In FIG. 5A, PE1 transmits data to PE2 using the database 503 as shown by arrow 502 while PE2 receives data via a TCP/IP socket as shown by arrow 504. PE2 transmits data to PE4 using RDMA (arrow 506) while PE4 transmits data to PE5 using RAM (i.e., shared memory) as shown by arrow 508. Also, PE4 and PE5 are executed by the same compute node 130$_1$. FIG. 5A may illustrate the arrangement of the operator graph after the stream manager 134 has prioritized and assigned the processing elements and communication protocols. Generally, a processing element may be capable of using multiple communication protocols to transmit data to any one processing element. A processing element may also use different communication protocols when transmitting data to different downstream processing elements (e.g., PE1 uses the relational database 503 to transmit data to PE2 but uses TCP/IP sockets for transmitting data to PE3).

For FIGS. 5-7, it is assumed that each processing element is able to transmit data using any communication protocol; however, in another embodiment, a processing element may not be able to use all the communication protocols available to another processing element. A processing element may store the types of communication protocols it can use in the stream connection data 255 so that the stream manager 134 can access that information when assigning a communication protocol for the processing element.

In FIG. 5B, the stream manager 134 instructs multiple pairs of communicatively coupled processing elements to switch to a different communication protocol. This may be for any of the reasons discussed previously. As a result of switching, PE1 now transmits data to PE3 using the database 503 while PE1 transmits data to PE2 using TCP/IP. Switching communication protocols may be accomplished by routing the respective data to a different communication adapter 215 located on the compute node associated with PE1. PE2 and PE3 may also use different communication adapters 215 associated with the new communication protocols in order to receive the transmitted data. Further, PE4 now transmits data to PE5 using TCP/IP. Note that even though PE4 and PE5 are located on the same compute node 130$_1$, the communication protocol used to communicate between the two may be an inter-nodal rather than an intra-nodal communication protocol.

However, PE2 and PE4 continue to use the same communication protocol used in FIG. 5A. This may because the pair of processing elements or the associated communication protocol (i.e., a RDMA protocol) is meeting the performance standards or goals of the stream application. Further, the same communication protocol may be used between more than two pairs of processing elements. In one embodiment, PE1 might communicate with PE2 and PE3 using the same protocol.

Figure 6A:
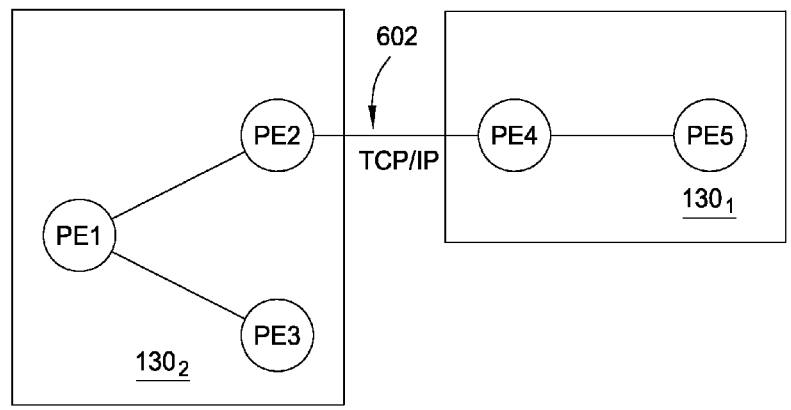
FIG. 6A-6B illustrate changing communication protocols for processing elements, according to one embodiment of the invention.
Figure 6B:
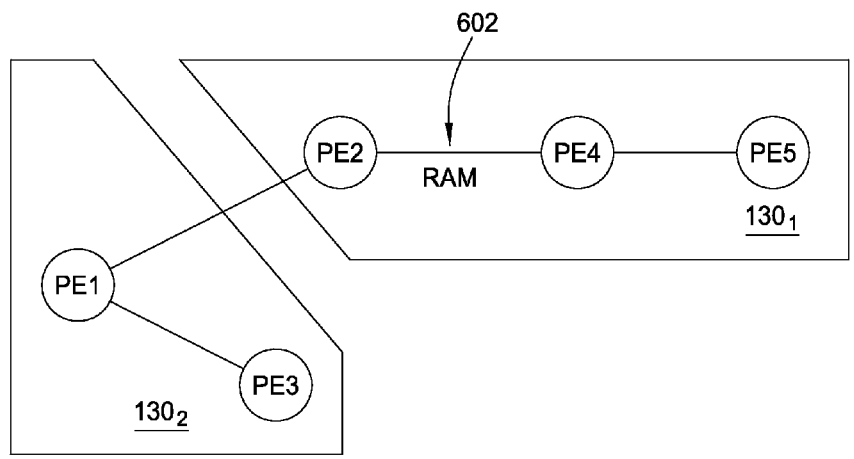

FIG. 6A-6B illustrate changing communication protocols for processing elements, according to one embodiment of the invention. In FIG. 6A, PE1, PE2, and PE3 are executed by compute node 130$_2$ while PE4 and PE5 are executed by compute node 130$_1$. PE2 transmits data to downstream PE4 using a TCP/IP socket as shown by arrow 602.

FIG. 6B illustrates that switching communication protocols may involve moving the processing element to a different compute node. For example, the stream manager 134 instructs PE2 and PE4 to stop transmitting data using TCP/IP—an inter-nodal communication protocol—and instead transmit data via RAM—an intra-nodal communication protocol. Because PE2 is not executed by the same compute node as PE4 and thus may not have access to the same associated shared memory 245, the stream manager 134 may move PE2 from compute node $130_2$ to compute node $130_1$. In this manner, PE2 may be able to transmit data to PE4 faster than if the pair continued to use TCP/IP.

Figure 7A:
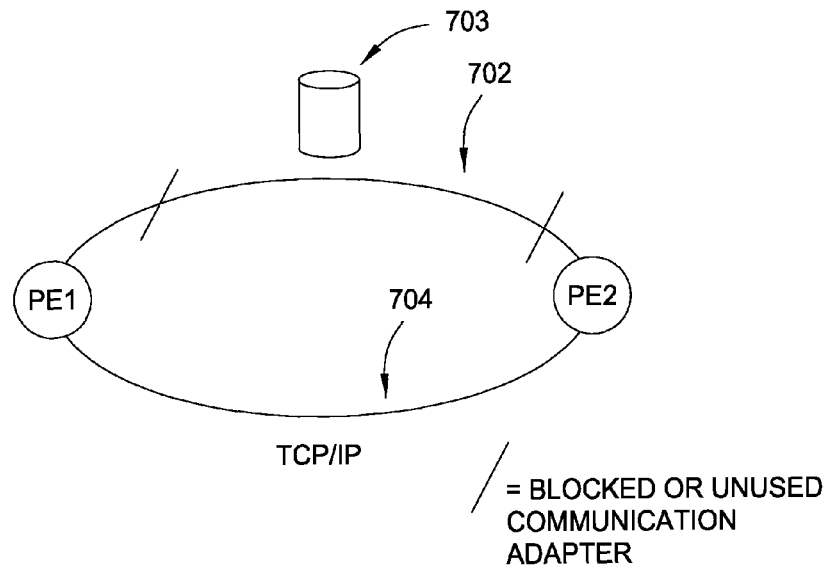
FIG. 7A-7B illustrate changing a communication protocol for a processing element, according to one embodiment of the invention.
Figure 7B:
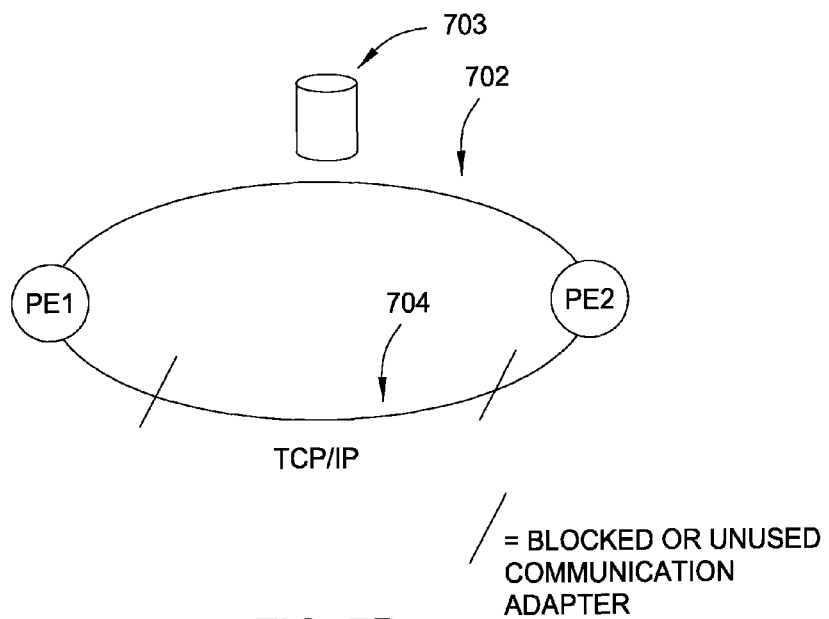

FIG. 7A-7B illustrate changing a communication protocol for a processing element, according to one embodiment of the invention. FIG. 7B illustrates two processing elements that are communicatively coupled simultaneously via two different communication protocols. As shown, PE1 is configured to transmit data to PE2 via either path 704 or path 702. Path 704 uses TCP/IP while path 702 uses a relational database 703. However, the communication adapter 215 associated with the relational database 703 and path 702 is blocked or unused. That is, PE1 does not transmit data to PE2 using path 702 and the relational database 703. Instead, PE1 transmits (and PE2 receives) data on path 704 via a TCP/IP socket. Nonetheless, PE1 and PE2 are simultaneously coupled via the two communication protocols although one of those protocols is unused.

FIG. 7B illustrates switching from the currently active communication protocol to the blocked or unused communication protocol. Specifically, after receiving instructions from the stream manager 134 to switch communication protocols, PE1 may send a message via path 704 that informs PE2 that all future data transmissions will occur via path 702 using the relational database 703. Both PE1 and PE2 may unblock the adapters 215 associated with the now active communication protocol (i.e., database 703) and block the adapter 215 associated with TCP/IP. Alternatively, PE2 may not block path 702 but constantly monitor the path 702 waiting for PE1 to begin transmitting data using the relational database 703. In this manner, PE1 would not need to inform PE2 before switching communication protocols.

Simultaneously coupling two processing elements via two or more communication protocols advantageously allows the pair to switch between communication protocols without having to reset the processing element. That is, the switching may occur almost instantaneously. Without this method, while the processing elements are resetting, the buffered stream data 260 associated with PE1 may fill up with data received from upstream processing elements, while processing elements downstream from PE2 may stall waiting for more transmitted data. This functionality may be used in any of the switching methods discussed in FIGS. 5-6.

Generally, a pair of processing elements is assigned a communication protocol before the operator graph begins to stream data. This assignment may be based on a priority of the processing elements or a priority of a communication protocol. After the operator graph begins to stream data, the pair of processing elements may switch to a different communication protocol. The decision to switch the communication protocol may be based on whether the pair of processing elements or associated communication protocol is meeting established performance standards for the stream application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product for processing data, the computer program product comprising:
   a computer-readable memory having computer-readable program code embodied therewith, the computer-readable program code comprising computer-readable program code configured to:
   establish an operator graph of a plurality of processing elements, the operator graph defining at least one execution path, wherein a first processing element of the plurality of processing elements is located on a first compute node and configured to transmit data to at least one downstream processing element, and wherein the first processing element is capable of transmitting data to the at least one downstream processing element by selecting either or both of a first and a second communication protocol, whereby the first processing element is capable of dynamically switching from the first communication protocol to the second communication protocol, and vice versa;
   transmit data from the first processing element to the at least one downstream processing element using a selected one of the first and the second communication protocols;
   determine, while the selected one of the first and second communication protocols is selected, whether to switch to the other of the first and second communication protocols; and
   upon determining to switch, determine whether to move the first processing element from the first compute node onto a second compute node before transmitting data from the first processing element to the at least one downstream processing element using the other of the communication protocols.

2. The computer program product of claim 1, wherein the computer-readable program code is further configured to:
   prioritize at least one of the plurality of processing elements and the first and second communication protocol based on at least one of a predicted amount of data to be transmitted by each of the plurality of processing elements, a job the plurality of processing elements are associated with, the cost of the first and second communication protocol, a data transfer rate of the first and second communication protocol, and an energy cost of the first and second communication protocol; and
   before transmitting data using the one of the first and second communication protocols, assign the first processing element to use the one of the first and the second communication protocol based on the prioritization.

3. The computer program product of claim 2, wherein determining whether to switch is based on the prioritization.

4. The computer program product of claim 1, wherein the first communication protocol is an inter-nodal communication protocol and wherein the second communication protocol is an intra-nodal communication protocol.

5. The computer program product of claim 4, wherein the first processing element is on a different compute node as the at least one downstream processing element when transmitting data using the first communication protocol, and wherein the first processing element is on a same compute node as the at least one downstream processing element when transmitting data using the second communication protocol.

6. The computer program product of claim 1, wherein determining whether to switch from the first communication protocol to the second communication protocol is based on at least one of computer processing unit (CPU) utilization, page faults, system limitations of the first and second communication protocol, and contention between two of the plurality of processing elements using the first communication protocol.

7. A system for processing data, comprising:
a computer processor; and
a memory containing a program that, when executed on the computer processor, performs an operation for processing data, comprising:
establishing an operator graph of a plurality of processing elements, the operator graph defining at least one execution path, wherein a first processing element of the plurality of processing elements is located on a first compute node and configured to transmit data to at least one downstream processing element, and wherein the first processing element is capable of transmitting data to the at least one downstream processing element by selecting either or both of a first and a second communication protocol, whereby the first processing element is capable of dynamically switching from the first communication protocol to the second communication protocol, and vice versa;
transmitting data from the first processing element to the at least one downstream processing element using a selected one of the first and second communication protocols;
determining, while the selected one of the first and second communication protocols is selected, whether to switch to the other of the first and second communication protocols; and
upon determining to switch, determining whether to move the first processing element from the first compute node onto a second compute node before transmitting data from the first processing element to the at least one downstream processing element using the other of the communication protocols.

8. The system of claim 7, wherein the operation further comprises:
prioritizing at least one of the plurality of processing elements and the first and second communication protocol based on at least one of a predicted amount of data to be transmitted by each of the plurality of processing elements, a job the plurality of processing elements are associated with, the cost of the first and second communication protocol, a data transfer rate of the first and second communication protocol, and an energy cost of the first and second communication protocol; and
before transmitting data using the one of the first and second communication protocols, assigning the first processing element to use the one of the first and the second communication protocols based on the prioritization.

9. The system of claim 8, wherein determining whether to switch is based on the prioritization.

10. The system of claim 7, wherein the first communication protocol is an inter-nodal communication protocol and wherein the second communication protocol is an intra-nodal communication protocol.

11. The system of claim 10, wherein the first processing element is on a different compute node as the at least one downstream processing element when transmitting data using the first communication protocol, and wherein the first processing element is on a same compute node as the at least one downstream processing element when transmitting data using the second communication protocol.

12. A computer program product for processing data, the computer program product comprising:
a computer-readable memory having computer-readable program code embodied therewith, the computer-readable program code comprising computer-readable program code configured to:
establish an operator graph of a plurality of processing elements, the operator graph defining at least one execution path, wherein a first processing element of the plurality of processing elements is located on a first compute node and configured to transmit data to at least one downstream processing element, and wherein the first processing element is capable of transmitting data to the at least one downstream processing element by selecting one or more communications protocols from a plurality of available communications protocols;
transmit, by one or more computer processors, data from the first processing element to the at least one downstream processing element using the selected communication protocols; and
determine, based on one or more measures of performance for transmitting data using the selected communication protocols, whether moving the first processing element onto a second compute node will improve at least one of the measures of performance using one of the plurality of available communication protocols.

13. The computer program product of claim 12, wherein the one or more measures of performance include at least one of computer processing unit (CPU) utilization, page faults, limitations of the first and second communication protocol, and contention between two of the plurality of processing elements using the first communication protocol.

14. The computer program product of claim 12, wherein determining whether to switch is further based on one or more factors not based on performance.

15. The computer program product of claim 14, wherein the one or more factors include at least one of operating costs of the first communication protocol and the second communication protocol, and deterioration of hardware components.

16. The computer program product of claim 12, wherein the first communication protocol is initially selected based on a determined priority over the second communication protocol.

17. The computer program product of claim 16, wherein the first communication protocol is initially selected further based on a determined priority for at least one of the plurality of processing elements.

18. The computer program product of claim 1, wherein determining whether to switch comprises:

in a first instance, switching from the first communication protocol to the second communication protocol; and in a second instance, switching from the second communication protocol to the first communication protocol.

19. The computer program product of claim 1, wherein the first processing element is communicatively coupled to the at least one downstream processing element by both the first and the second communication protocols simultaneously.

20. The system of claim 7, wherein determining whether to switch comprises:

in a first instance, switching from the first communication protocol to the second communication protocol; and in a second instance, switching from the second communication protocol to the first communication protocol.

21. The system of claim 7, wherein the first processing element is communicatively coupled to the at least one downstream processing element by both the first and the second communication protocols simultaneously.

* * * * *